Patented June 1, 1954

2,680,117

UNITED STATES PATENT OFFICE 2,680,117

5-NITRO-2-SUBSTITUTED THIOPHENES AND PROCESS

Edward C. Hermann, Wilmington, Del., assignor to E. I. du Pont de Nemours and Company, Wilmington, Del., a corporation of Delaware No Drawing. Application May 18, 1951, Serial No. 227,117

8 Claims. (Cl. 260—332.2)

This invention relates to certain 5-nitro-2-substituted thiophenes. More particularly, it relates to the three compounds 5-nitro-2-thiophenecarboxaldehyde, 5-nitro-2-thiophenemethanediol diacetate, and 5-nitro-2-thiophenemethanediol di-n-propionate, and to processes for making the compounds.

The 5-nitro-2-substituted thiophene compounds of the invention are represented by the formula

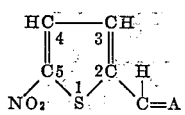

where A is a member of the group oxygen, diacetate, and di-n-propionate.

The 5-nitro-2-thiophenemethanediol di(aliphatic carboxalate)s of the invention, namely, 5-nitro-2-thiophenemethanediol diacetate and 5-nitro-2-thiophenemethanediol di-n-propionate are prepared by a process comprising reacting 2-thiophenecarboxaldehyde with an acid anhydride selected from the group consisting of acetic anhydride and n-propionic anhydride to form a 2-thiophenemethanediol di(aliphatic carboxalate) in which the aliphatic carboxalate radical is acetate or n-propionate depending upon the acid anhydride reactant used. The reaction is initiated by and carried out in the presence of a catalytic amount of a mineral acid and the product of the reaction is then nitrated in the presence of one of the aforementioned acid anhydrides to give the desired 5-nitro-2-thiophenemethanediol di(aliphatic carboxalate). 5-nitro-2-thiophenecarboxaldehyde is easily obtained by hydrolyzing either of the 5-nitro-2-thiophenemethanediol di(aliphatic carboxalate)s.

In carrying out the processes of the invention, the reaction of 2-thiophenecarboxaldehyde with the acid anhydride is initiated by the addition of a mineral acid. The reaction cannot be induced in the absence of such acid. Once initiated by the mineral acid catalyst, the reaction is exothermic and proceeds rapidly.

Sulphuric acid is the preferred mineral acid catalyst used to catalyze the 2-thiophenecarboxaldehyde-acid anhydride reaction tho other mineral acids such as hydrochloric, nitric, phosphoric, and hydrofluoric, for example, can be used.

The amount of mineral acid required to catalyze the 2-thiophenecarboxaldehyde-acid anhydride reaction varies with the particular mineral acid employed and with the purity of the reactants but, in general, a very small amount is required in proportion to the quantity of reactants; thus using sulphuric acid, for example, the reaction of acetic anhydride or n-propionic anhydride with pure 2-thiophenecarboxaldehyde is readily initiated by using as little as one part by weight of concentrated sulphuric acid for each 1500 to 2,000 parts by weight of the aldehyde. Larger amounts of the mineral acid can be used but there is no advantage in having more than is needed to start the reaction and this minimum amount is readily determined in each case simply by adding a mineral acid to a mixture of the reactants until the exothermic reaction starts.

It is much preferred to have the 2-thiophenecarboxaldehyde employed in the processes of the invention substantially free of contaminants which tend to hinder the reaction with the acid anhydride. Some commercial 2-thiophenecarboxaldehyde, for example, reacts slowly or incompletely with acetic or propionic anhydrides if at all, notwithstanding the addition of relatively large amounts of mineral acid catalyst. Commercial 2-thiophenecarboxaldehyde frequently has a dark color and an acrid odor. Such product can be freed of the color and the acrid odor by washing first with aqueous alkaline solution, then with an aqueous acid solution, followed by distillation of the aldehyde. The resulting purified product is water white, has a pleasant benzaldehyde-like odor and reacts readily with acetic or propionic anhydride in the presence of a minor amount of a mineral acid.

The next step in the processes of the invention, the nitration of 2-thiophenemethanediol di(aliphatic carboxalate) is carried out under relatively mild nitrating conditions. Thus the nitration can be suitably carried out by bringing together the di(aliphatic carboxalate) with an acyl nitrate such as acetyl nitrate or n-propionyl nitrate with agitation at a relatively low temperature, say, around 0° C. or less.

Preferably the nitration is carried out by suspending the 2-thiophenemethanediol di(aliphatic carboxalate) in a body of acid anhydride such as acetic anhydride or n-propionic anhydride and then adding fuming nitric acid slowly to the suspension with stirring while cooling the reacting mass. The acid anhydride is used in at least the stoichiometric amount required to react with the fuming nitric acid to form the corresponding acyl nitrate.

The 5 - nitro - 2 - thiophenemethanediol diacetate or di-n-propionate prepared as above are readily converted to the 5-nitro-2-thiophenecarboxaldehyde of the invention by acid hydrolysis carried out according to conventional hydrolysis techniques. Thus the hydrolysis to 5-nitro-2-thiophenecarboxaldehyde is effected by heating an acidified aqueous suspension of the 5-nitro-2-thiophenemethanediol di(aliphatic carboxalate). The acidifying agent is a mineral acid, preferably sulfuric or hydrochloric acid. Since the nitrated di(aliphatic carboxalates) used in this step are relatively insoluble in water, the hydrolysis rate can be increased by bringing the reactants into solution by addition of a suitable solvent such as ethanol to the aqueous mass.

The compounds of the invention have useful fungicidal and bactericidal properties and have considerable activity against the oocysts of *Eimeria tenella*. They are particularly valuable as intermediates for the preparation of other biologically active compounds, as for example, in the preparation of 5-nitro-2-thiophenecarboxamides, certain members of which class are claimed in a coassigned Williamson patent application, Serial No. 133,003, filed December 14, 1949.

The invention will be more readily understood by reference to the following examples which illustrate the compounds of the invention and methods for their preparation.

EXAMPLE I

*5-nitro-2-thiophenemethanediol diacetate*

105 parts by weight of 2-thiophenecarboxaldehyde and 102 parts by weight of acetic anhydride were mixed at room temperature in a vessel equipped with a reflux condenser. Approximately 0.1 part by weight of concentrated sulfuric acid was added to the mixture. Immediately, an exothermic reaction started.

After the exothermic reaction had subsided, the reaction mass was cooled and the entire mass crystallized. The crystalline product was broken up, washed on a filter with 35 parts by weight of ether, then washed with water, then finally dried overnight in a vacuum over phosphorous pentoxide.

190 parts by weight (99% yield) of the crude 2-thiophenemethanediol diacetate was obtained. On recrystallization of this material from ether and decolorization with charcoal there was obtained 168 parts by weight (88% yield) of colorless crystals, M. P. 67–68° C.

*Analysis.*—Calcd. for $C_9H_{10}O_4S$: C, 50.45; H, 4.70; S, 14.96. Found: C, 50.48; H, 4.90; S, 15.21.

80 parts by weight of 2-thiophenemethanediol diacetate prepared as above was stirred into 63.6 parts by weight of acetic anhydride to form a suspension of the diacetate. The mixture was cooled to −5° C. and with continuous stirring, 39.2 parts by weight of fuming nitric acid (D=1.5) was added slowly over a period of 86 minutes while maintaining the temperature of the reacting mass between about −5 and −10° C. Stirring and cooling were continued for one hour after completion of nitric acid addition. The reaction mass was then in the form of a yellow paste.

100 parts by weight of water were added to the yellow paste and the mixture was at once poured into 250 parts by weight of ice water. The insoluble product was separated by filtration and washed with water until the filtrate was nearly colorless. The moist filter cake was recrystallized at once from absolute alcohol, including treatment with decolorizing charcoal, and washed with petroleum naphtha. Yield, 71 parts by weight (73%) of 5-nitro-2-thiophenemethanediol diacetate, a slightly yellow colored crystalline powder, M. P. 64–69° C. A sample of the product recrystallized five times from ether had a constant melting point of 72–73° C.

*Analysis.*—Calcd. for $C_9H_9NO_6S$: C, 41.71; H, 3.50; N, 5.40; S, 12.37. Found: C, 42.23; H, 3.56; N, 5.26; S, 12.36.

EXAMPLE II

*5-nitro-2-thiophenecarboxaldehyde*

A mixture of 51.8 parts by weight of 5-nitro-2-thiophenemethanediol diacetate (M. P. 64–69° C.), prepared as above, 100 parts by weight of water, 80 parts by weight of 95% ethanol and about 19 parts by weight of concentrated sulfuric acid was heated under reflux for thirty minutes. The hot solution was then filtered and the filtrate chilled to induce crystallization.

The product 5-nitro-2-thiophenecarboxaldehyde crystallized from the reaction mass in the form of pale yellow needles. The crystalline product was washed with cold water and dried in a vacuum over calcium chloride. A yield of 27.3 parts by weight (87%) of 5-nitro-2-thiophenecarboxaldehyde was obtained, M. P. 68–70° C. On recrystallization from approximately 180 parts by weight of 50% aqueous ethanol, 21.7 parts by weight (69%) of the product was obtained, M. P. 73–74° C.

For analysis a sample of the 5-nitro-2-thiophenecarboxaldehyde of this example was recrystallized from 50% ethanol to a constant M. P. of 73.5–74° C. and dried in a vacuum desiccator over phosphorous pentoxide at room temperature.

*Analysis.*—Calcd. for $C_5H_3NO_3S$: C, 38.21; H, 1.92; N, 8.92; S, 20.40. Found: C, 38.15; H, 2.25; N, 8.38; S, 19.98.

EXAMPLE III

*5-nitro-2-thiophenecarboxaldehyde*

615 parts by weight of acetic anhydride and 204 parts by weight of 2-thiophenecarboxaldehyde (freshly purified) were mixed at room temperature. Approximately 0.2 part by weight of concentrated sulfuric acid was added to the mixture. Immediately there was an exothermic reaction, and the reaction mixture turned brown and changed rapidly to a dark green color. The mixture was allowed to stand for 45 minutes, and was then cooled to −5° C. by the direct addition of Dry Ice. During the cooling operation, pale green crystals began to appear when the temperature reached 21° C.

181 parts by weight of fuming nitric acid (D=1.5) was added dropwise to the resulting suspension of the pale green crystals over a period of 63 minutes while adding Dry Ice to maintain the temperature of the reaction mixture at −5° C. The resulting red nitration mixture was then quenched with a mixture of ice and water. After filtering and washing at 0°, 549 parts by weight of a brilliant yellow crystalline product, 5-nitro-2-thiophenemethanediol diacetate, was obtained (damp weight).

The crude 5-nitro-2-thiophenemethanediol diacetate was hydrolyzed, without further drying or purification, by refluxing for 30 minutes with 124 parts by weight of concentrated sulfuric acid in 1400 parts by weight of approximately 50% aqueous ethanol. The hydrolysate was cooled by the direct addition of ice, and 365 parts by weight of crude 5-nitro-2-thiophenecarboxaldehyde was obtained as a dark brown precipitate. This material was redissolved in 50% ethanol, treated with decolorizing charcoal, and cooled to crystallize a brown, needle-like product (164 parts by dry weight, melting point 63–70° C.). A second crop (20 parts by dry weight, melting point 62–69° C.) was recovered by diluting the filtrate with water. The product was dried in a vacuum oven at 25° C. The identity of the product was confirmed by mixed melting point with a pure sample of 5-nitro-2-thiophenecarboxaldehyde.

Recrystallization of a 27 part by weight portion of the first crop of product from a 50% aqueous ethanol yielded 16 parts by weight of a light tan product, melting at 73–74° C.

EXAMPLE IV

5-nitro-2-thiophenemethanediol dipropionate 105 parts by weight of 2-thiophenecarboxaldehyde and 130 parts by weight of propionic anhydride were mixed at room temperature in a vessel equipped with a reflux condenser. Approximately 0.1 part by weight of concentrated sulfuric acid was added to the mixture. Immediately an exothermic reaction started. After the exothermic reaction had subsided, the reaction mixture was allowed to cool to room temperature and was then poured into 2500 parts by weight of ice water. The green-colored oil which separated from the resulting mixture was recovered by extracting the mixture two times with ether. The combined ether extracts were dried and the ether was then removed by distillation under reduced pressure, leaving a green, oily residue. This residue was distilled under vacuum through a 4″ Vigreux type column. 130 parts by weight of 2-thiophenemethanediol dipropionate was recovered as a fraction with B. P. 93–94° C. (0.1 mm. Hg), $n_D^{25}$ 1.4905.

*Analysis.*—Calcd. for $C_{11}H_{14}O_4S$: C, 54.53; H, 5.82; S, 13.23. Found: C, 55.11; H, 6.09; S, 13.91.

111 parts by weight of the 2-thiophenemethanediol dipropionate prepared as above was stirred into approximately 100 parts by weight of acetic anhydride. The mixture was cooled to −5° C. and with continuous stirring, 34 parts by weight of yellow fuming nitric acid (D=1.5) was added slowly over a period of approximately 80 minutes while maintaining the temperature of the reacting mass between −5 and −10° C. Stirring and cooling were continued for 23 minutes after completion of the nitric acid addition.

The reaction mixture so obtained was poured into 1000 parts by weight of ice water. The resulting mixture was allowed to stand at 0° for one hour and then the insoluble yellow oil phase was recovered by extracting the mixture twice with ether. The combined ether extracts were washed twice with saturated sodium bicarbonate solution and then dried. The ether was removed by distillation under reduced pressure and the residue was distilled under vacuum through a 6½″ Vigreux column. Crude 5-nitro-2-thiophenemethanediol dipropionate was obtained as 47 parts by weight of a yellow oil with B. P. 145–155° C. (0.5 to 0.75 mm. Hg).

EXAMPLE V

5-nitro-2-thiophenecarboxaldehyde

A mixture of 58 parts by weight of 5-nitro-2-thiophenemethanediol dipropionate prepared as in Example IV, 100 parts by weight of water, 80 parts by weight of 95% ethanol, and about 19 parts by weight of concentrated sulfuric acid was heated under reflux for 30 minutes. The hot solution was filtered and cooled and then poured into 500 parts by weight of ice water. The resulting mixture was extracted twice with ether. The ether was removed from the dried combined extracts by distillation under reduced pressure, giving a residue consisting of yellow crystalline material plus oil. The crystalline material was separated by filtration and washed with petroleum ether (B. P. 60–71° C.). The crystalline material was purified by sublimation at 62° C. and 0.8 mm. Hg pressure, giving a total of 13 parts by weight of 5-nitro-2-thiophenecarboxaldehye as yellow needles, M. P. 71.5–73° C.

EXAMPLE VI

5-nitro-2-thiophenemethanediol dipropionate

Approximately 1 part by weight of concentrated sulfuric acid was added to a mixture of 105 parts by weight of crude 5-nitro-2-thiophenecarboxaldehyde (M. P. 66–71° C.), 86.9 parts by weight of propionic anhydride and 100 parts by weight of dioxane. Immediately there was an exothermic reaction. The resulting mixture was stirred for one hour and then poured into 2500 parts by weight of ice water. The resulting mixture was extracted with ether and the ether extract was dried. The ether was then removed from the dried extract by distillation under reduced pressure. The residue was distilled under reduced pressure through a 4″ Vigreux type column. Crude 5-nitro-2-thiophenemethanediol dipropionate was obtained as 120 parts by weight of yellow oil with B. P. 145–158° (0.85–08. mm. Hg). Upon redistillation, 95 parts by weight of a yellow oil was obtained, B. P. 145–153.5° C. (0.35–0.3 mm. Hg).

I claim:

1. The method comprising forming 2-thiophenemethanediol di(aliphatic carboxalate), wherein the aliphatic carboxalate radical is selected from the group consisting of acetate and n-propionate, by reacting 2-thiophenecarboxaldehyde, in the presence of a catalytic amount of a mineral acid, with an acid anhydride selected from the group consisting of acetic anhydride and n-propionic anhydride, and nitrating said di(aliphatic carboxalate) compound in the presence of one of said acid anhydrides.

2. In the method for the preparation of 5-nitro-2-thiophenemethanediol diacetate, the steps comprising forming 2-thiophenemethanediol diacetate by reacting 2-thiophenecarboxaldehyde, in the presence of a catalytic amount of a mineral acid, with acetic anhydride, and nitrating said diacetate in the presence of acetic anhydride.

3. In the method for the preparation of 5-nitro-2-thiophenecarboxaldehyde, the steps comprising forming 2-thiophenemethanediol diacetate by reacting 2-thiophenecarboxaldehyde, in the presence of a catalytic amount of a mineral acid, with acetic anhydride, nitrating said diacetate in the presence of acetic anhydride, and hydrolyzing the nitrated diacetate.

4. In a method for the preparation of 5-nitro-2-thiophenecarboxaldehyde, the steps comprising forming 2-thiophenemethanediol diacetate by reacting 2-thiophenecarboxaldehyde, in the presence of a catalytic amount of sulfuric acid, with acetic anhydride, nitrating said diacetate by slowly adding fuming nitric acid to a mixture of the diacetate with acetic anhydride, and hydrolyzing the resulting nitrated diacetate by heating it in the presence of aqueous sulfuric acid solution.

5. A 5-nitro-substituted thiophene compound selected from the class consisting of 5-nitro-2-thiophenecarboxaldehyde, 5-nitro-2-thiophenemethanediol diacetate and 5-nitro-2-thiophenemethanediol di-n-propionate.

6. 5-nitro-2-thiophenecarboxaldehyde.

7. 5-nitro-2-thiophenemethanediol diacetate.

8. 5-nitro-2-thiophenemethanediol di-n-propionate.

References Cited in the file of this patent

UNITED STATES PATENTS

| Number | Name | Date |
|---|---|---|
| 2,502,114 | Witte et al. | Mar. 28, 1950 |

OTHER REFERENCES

Alles, J. of Pharm. and Exp. Ther., vol. 42, p. 265 (1941).